US012776637B2

(12) United States Patent
Jackson et al.

(10) Patent No.: US 12,776,637 B2
(45) Date of Patent: Oct. 27, 2026

(54) SEALING CABLES

(71) Applicant: Hubbell Limited, London (GB)

(72) Inventors: Carl Jackson, Greater Manchester (GB); Gareth Turner, Greater Manchester (GB); Matthew James Ogden, Greater Manchester (GB)

(73) Assignee: Hubbell Limited, London (GB)

( * ) Notice: Subject to any disclaimer, the term of this patent is extended or adjusted under 35 U.S.C. 154(b) by 271 days.

(21) Appl. No.: 17/776,381

(22) PCT Filed: Nov. 11, 2020

(86) PCT No.: PCT/GB2020/052861

§ 371 (c)(1),
(2) Date: May 12, 2022

(87) PCT Pub. No.: WO2021/094741

PCT Pub. Date: May 20, 2021

(65) Prior Publication Data

US 2022/0399710 A1 Dec. 15, 2022

(30) Foreign Application Priority Data

Nov. 12, 2019 (GB) .................................... 1916430

(51) Int. Cl.
*H02G 15/04* (2006.01)

(52) U.S. Cl.
CPC ................................ *H02G 15/046* (2013.01)

(58) Field of Classification Search
CPC .... H02G 15/02; H02G 15/013; H02G 15/046; H02G 15/113; H01R 43/12; H01B 17/30
USPC ......... 174/74 R, 74 A, 75 F, 75 D, 77 R, 78, 174/84 R, 84 C, 88 R, 92, 93
See application file for complete search history.

(56) References Cited

U.S. PATENT DOCUMENTS 3,597,528 A * 8/1971 Penfield .................. H01R 4/22 174/76
3,875,325 A 4/1975 Anderson et al.
3,937,870 A * 2/1976 Bumpstead ............ H02G 15/10 174/76
4,599,487 A * 7/1986 Blank ...................... H02G 3/22 174/76
4,839,473 A * 6/1989 Fox ........................ H02G 15/18 174/76

(Continued)

FOREIGN PATENT DOCUMENTS

CA 2875463 A1 * 6/2015 ........... H01B 17/583
CN 207750251 U 8/2018

(Continued)

OTHER PUBLICATIONS

International Search Report and Written Opinion mailed in Application No. PCT/GB2020/052861, dated Feb. 24, 2021.

(Continued)

*Primary Examiner* — William H. Mayo, III
(74) *Attorney, Agent, or Firm* — Robinson + Cole LLP

(57) ABSTRACT

A method of sealing a cable (10), the cable having at least one core (11) and at least one sheath (12) surrounding at least one core (11), the method acting to seal each core (11) relative to each sheath (12), the method includes exposing each core (11) from each sheath (12) to form an exposed part of each core (11), with an unexposed part of a core (11) remaining with each sheath (12), positioning the exposed part of each core (11) and the unexposed part of each core (11) within a tube (1), and filling the tube (1) with a settable sealing material (6).

20 Claims, 4 Drawing Sheets

(56) References Cited

U.S. PATENT DOCUMENTS

| | | | | | |
|---|---|---|---|---|---|
| 4,849,580 | A * | 7/1989 | Reuter | H01R 13/5216 | 174/76 |
| 5,397,859 | A | 3/1995 | Robertson et al. | | |
| 7,232,953 | B2 * | 6/2007 | Torii | H01R 4/22 | 174/76 |
| 7,253,362 | B1 * | 8/2007 | Dower | H01R 13/52 | 174/92 |
| 2012/0267146 | A1 | 10/2012 | Petry et al. | | |
| 2014/0030903 | A1 * | 1/2014 | Magno | H02G 15/046 | 29/863 |
| 2015/0144394 | A1 * | 5/2015 | Webb | H02G 1/14 | 174/658 |

FOREIGN PATENT DOCUMENTS

| | | | |
|---|---|---|---|
| DE | 82 18 763 | U1 | 8/1982 |
| DE | 2011101058 | U1 | 7/2011 |
| EP | 0 062 992 | A1 | 10/1982 |
| EP | 0 449 088 | A1 | 10/1991 |
| GB | 1204767 | A | 9/1970 |
| GB | 2249435 | A1 | 5/1992 |
| GB | 2258567 | A | 2/1993 |
| GB | 2227617 | B2 | 4/1993 |
| WO | 02/067400 | A1 | 8/2002 |

OTHER PUBLICATIONS

Search Report issued in GB Application No. 1916430.0, dated May 11, 2020.

European Patent Application No. 20811043.7 Examination Report dated Jan. 2, 2025.

European Patent Application No. 20811044.5 Examination Report dated Jan. 7, 2025.

* cited by examiner

SEALING CABLES

FIELD

This invention relates to methods of sealing cables, a seal for a cable, a sealed cable and a cable gland.

BACKGROUND

Cable glands are commonly used for sealing around a cable or conduit passing through an opening in a wall or bulkhead. For example, cable gland assemblies may be used to seal around a cable entering an enclosure such as a junction box, containing electrical equipment, to prevent fluids entering the enclosure or explosive forces exiting the enclosure. In some instances, cable glands can be used in harsh environments, such as underwater, in high temperatures, or harsh chemical environments.

Typically, a cable gland includes a body, through which the cable passes. The body is formed of a number of parts, that are fixed together to assemble the gland. Each joint can provide a source of leakage. A clamp to grip the cable, and prevent it being pulled out of the gland is provided in the body, along with a number of seals.

In a barrier gland, typically one of the seals may be formed by a settable sealing material that is introduced into a sleeve (or pot) through which the cable passes. The sleeve is then received in the body. During assembly, the settable material is allowed to set in the sleeve. The sleeve is then slid out of the body, to allow inspection of the seal formed around the cable, and then slid back in, before the assembly is continued.

It is possible, and often required where cables run from an environment where combustible gasses may be present to areas which are required to be free of such gasses, to use cables which prevent the flow of gasses or other materials within the cable, between typically the outer sheath and the cores. However, such cables are expensive and complex to manufacture. Less expensive cables are available, but they will potentially allow the flow of such gasses. As such, it is known to use barrier glands in such cases.

SUMMARY

According to a first aspect of the invention, we provide a method of sealing a cable, the cable having at least one core and at least one sheath surrounding at least one core, the method acting to seal each core relative to each sheath, the method comprising exposing each core from each sheath to form an exposed part of each core, with an unexposed part of a core remaining with each sheath, positioning the exposed part of each core and the unexposed part of each core within a tube, and filling the tube with a settable sealing material.

Thus, by filling the tube with a settable sealing material, a seal can be made around the cores and the junction between the exposed and unexposed parts of the cores. Thus, this can seal the end of the cable against any gas or other matter travelling within each sheath. The tube can then be sealed in a cable gland, without needing to use a barrier gland.

The tube may be rigid, in that it may have a Young's modulus greater than 3.5 MPa, 3.8 MPa or 5 MPa. The tube may be transparent, so that it can be seen that the settable sealing material has filled the tube. The tube may be formed of two parts that can be repeatedly separated and reconnected; as such, the step of positioning the parts within the tube can comprise placing the two parts around the exposed and unexposed parts. The two parts can be separate, or can be hinged together, typically via a living hinge moulded into the material of the two parts.

There may also be provided at least one end wall to cap at least one end of the tube and to stop the settable sealing material from escaping. Each end wall may have at least one orifice for the cable or each core.

There may be at least one twisted pair of cores, each twisted pair of cores comprising two cores, twisted around each other, typically in a helix. Each twisted pair may remain twisted through the tube. As such, this allows a twisted pair to be sealed before being passed through a cable gland; at present, most cable glands require that a twisted pair be untwisted, which can deleteriously affect the electronic performance of such a twisted pair.

According to a second aspect of the invention, there is provided a seal for a cable having at least one core and at least one sheath surrounding at least one core, the seal comprising a tube arranged to be placed over an exposed part of each core where the sheath has been removed from around the core and an unexposed part of each core where the sheath surrounds the core, and a settable sealing material arranged to fill the core.

The tube may be rigid, in that it may have a Young's modulus greater than 3.5 MPa, 3.8 MPa or 5 MPa. The tube may be transparent, so that it can be seen that the settable sealing material has filled the tube. The tube may be formed of two parts, split along a length of the tube, that can be repeatedly separated and reconnected. The two parts can be separate, or can be hinged together, typically via a living hinge moulded into the material of the two parts.

There may also be provided at least one end wall to cap at least one end of the tube and to stop the settable sealing material from escaping. Each end wall may have at least one orifice for the cable or each core.

According to a third aspect of the invention, there is provided a cable sealed by the seal of the second aspect of the invention, the cable comprising at least one core and at least one sheath surrounding at least one core, the tube surrounding an exposed part of each core where the sheath has been removed from around the core and an unexposed part of each core where the sheath surrounds the core and being filled with the settable sealing material.

The cable may comprise at least one twisted pair of cores, each twisted pair of cores comprising two cores, twisted around each other, typically in a helix. Each twisted pair may remain twisted through the tube. As such, this allows a twisted pair to be sealed before being passed through a cable gland; at pre sent, most cable glands require that a twisted pair be untwisted, which can deleteriously affect the electronic performance of such a twisted pair.

The seal may prevent the flow of gas or other material through the cable between each sheath and each core.

According to a fourth aspect of the invention, there is provided a cable gland sealed onto an outer surface of the tube of the sealed cable of the third aspect of the invention.

The cable gland may not be a barrier gland.

BRIEF DESCRIPTION OF THE DRAWINGS

There now follows, by way of example only, description of embodiments of the invention, described with reference to the accompanying drawings, in which.

DETAILED DESCRIPTION

Figure 1:
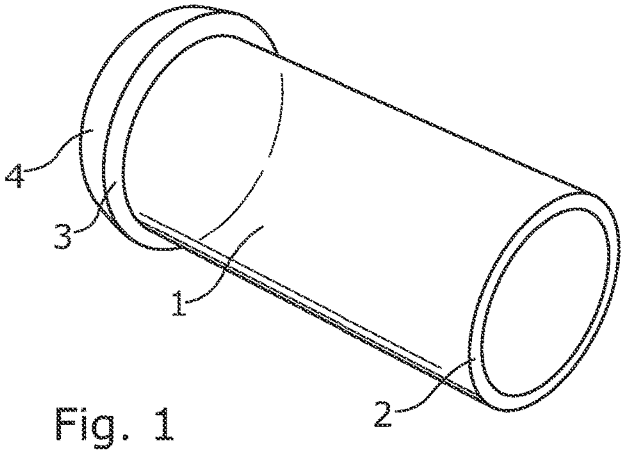
FIG. 1 shows a perspective view of a seal for a cable in accordance with a first embodiment of the invention.

In a first embodiment of the invention illustrated in FIGS. 1 to 5 of the accompanying drawings, we provide a seal for sealing a cable 10. The seal acts to seal an end or part of a cable 10 against the passable of gasses or other matter through the sheaths of a cable 10.

The cable 10 with which this seal can be used can vary depending on the user's requirements, but will generally be made up of at least an outer sheath 12 surrounding a number of conductive cores 11 each of which may have their own individual insulating sheathes 13. It is desirable to be able to seal the cable 10 against gasses or other material passing through the cable within the sheathes 12, 13, whether at a termination of the cable 10 or along its length.

As such, the seal comprises a tube 1 which can be placed over the cable 10. The tube 1 is formed of rigid plastics material, such as 1 mm thickness polyphenylene sulphide. The tube has first 2 and second 3 ends, with a seal 4 at the second end 3 and the first end 2 being open. The seal 4 has an orifice 5 for the cable 10 to pass through.

In use, the tube 1 is placed over the cable 10 at a point where at least the outer sheath 12 has been stripped away from the cores 11, typically leaving the individual core sheathes 13 extant. The tube is then filled with a settable sealing material 6, such as a two part epoxy resin through the first end 2. Because the tube 1 is transparent, it can be verified (as in FIG. 3) that the tube 1 is full of the settable sealable material 6. The seal 4 prevents the settable sealing material leaking out of the second end 3.

In an alternative embodiment, the first end 2 can be provided with a seal as for the second end 3, with orifices for each of the cores. This will retain the settable sealing material 6 no matter what orientation is used. The settable sealing material 6 will then need to be introduced into the tube 1 through a conduit, such as a needle piercing the tube 1 wall, with a similar exhaust conduit allowing the escape of air from within the tube 1 as it is filled with settable sealing material 6.

Returning now to the embodiment of FIGS. 1 to 5, once the settable sealing material sets (whether through the passage of time, or by heat or ultraviolet curing, depending on the material chosen), the cable 10 will be sealed against the passage of gas or other material between the outer sheath 12 and the individual sheaths 14. Thus, lower-quality cables can be used in situation that would otherwise require cables that had been manufactured to be so sealed.

Figure 2:
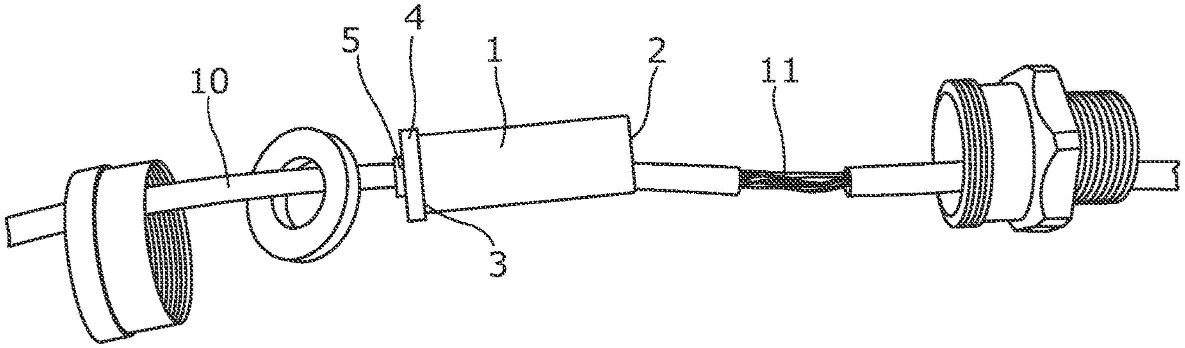
FIG. 2 shows an exploded view of a seal being made with the seal of FIG. 1.

The seal thus formed can be used in several situations. As shown in FIG. 2 of the accompanying drawings, the tube is being used at a point along the length of the cable 10, not at an end. This is useful where the cable 10 is not terminating at a cable gland, but is passing through. Furthermore, the cores 11 are formed as twisted pairs. The seal of the present invention does not require that the pairs be untwisted in order to seal them, which can have a deleterious effect on their performance electronically; the settable sealing material 6 will simply flow around the cores 11 whilst they are still twisted.

Figure 3:
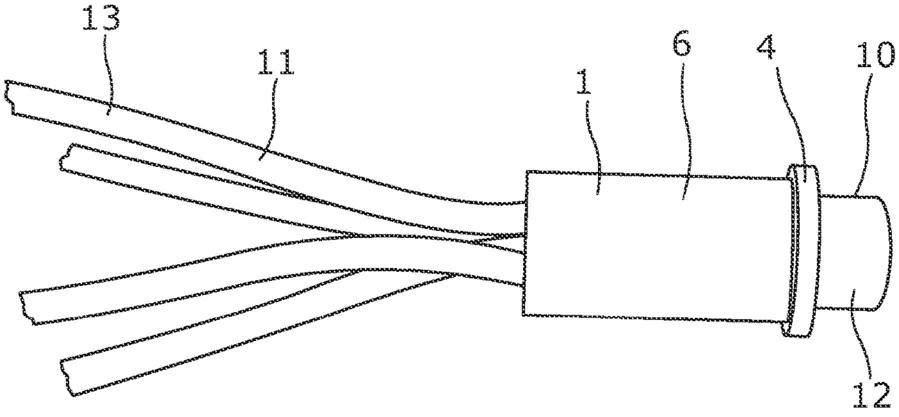
FIG. 3 shows a plan view of the seal of FIG. 1 having been used to make a seal of a cable.

As shown in FIG. 3 of the accompanying drawings, the seal has sealed an end of a cable 10 having three cores 11. The settable sealing material 6 has filled the tube 1 so as to provide visual evidence that there are no voids of the settable sealing material 6.

Figure 4:
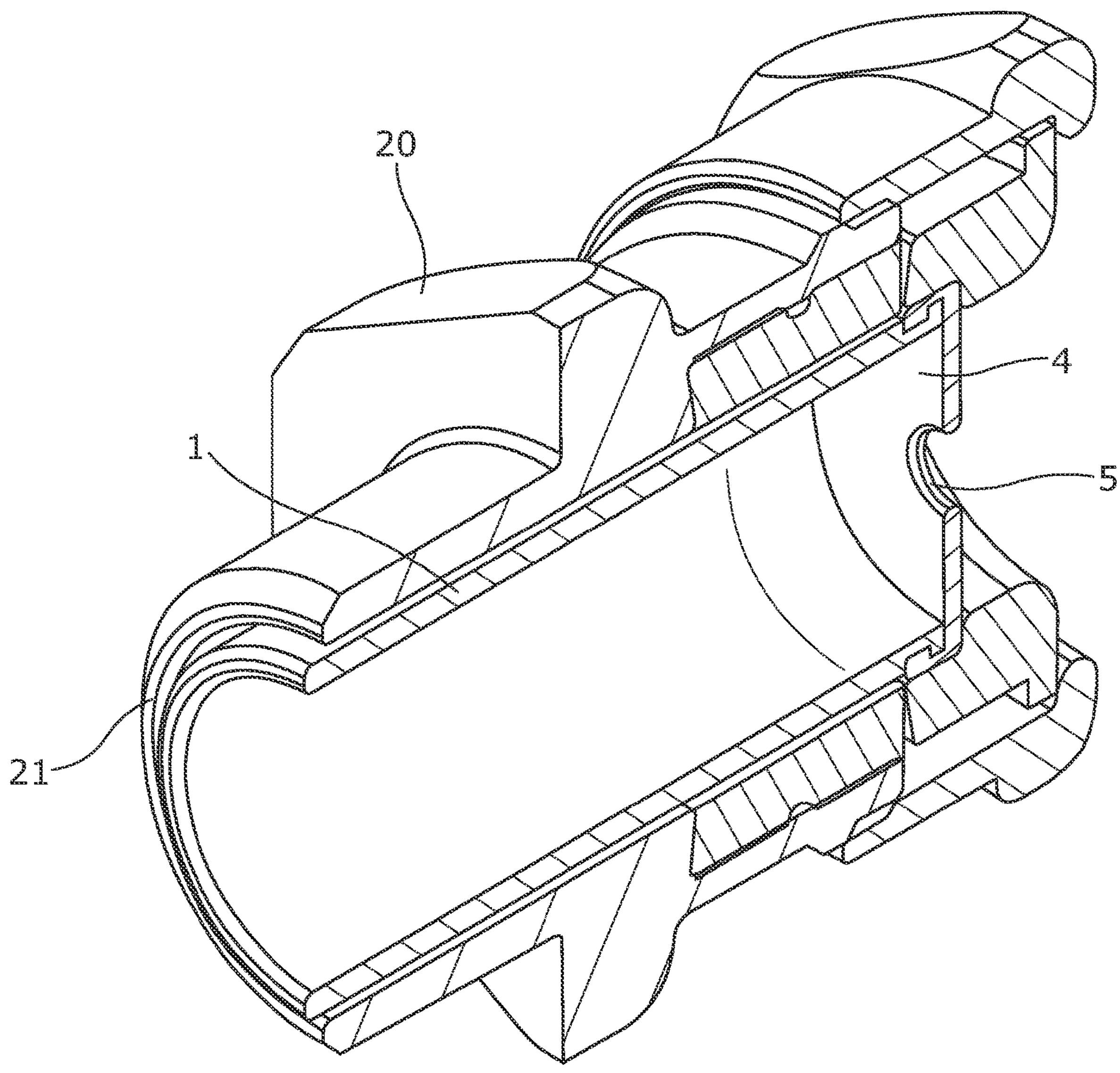
FIGS. 4 and 5 show perspective cross-sectional views of the seal of FIG. 1 in use in two different cable glands.

The seal can also be used within cable glands, such that a dedicated barrier gland is not required. FIG. 4 of the accompanying drawings shows a cable gland 20 which has a bore 21 in which the tube 1 is placed. Typically, the tube 1 would contain the cable 10 and the settable sealing material, but they are not shown in FIG. 4 or 5 for clarity's sake. Rather than sealing against the cable 10, the cable gland seals against the outside of the tube 1. As such, any convenient cable gland, not necessarily a barrier gland, can be used; in FIG. 4, a 501/421 cable gland from Hawke International (a division of Hubbell) of Ashton under Lyne, United Kingdom.

Figure 5:
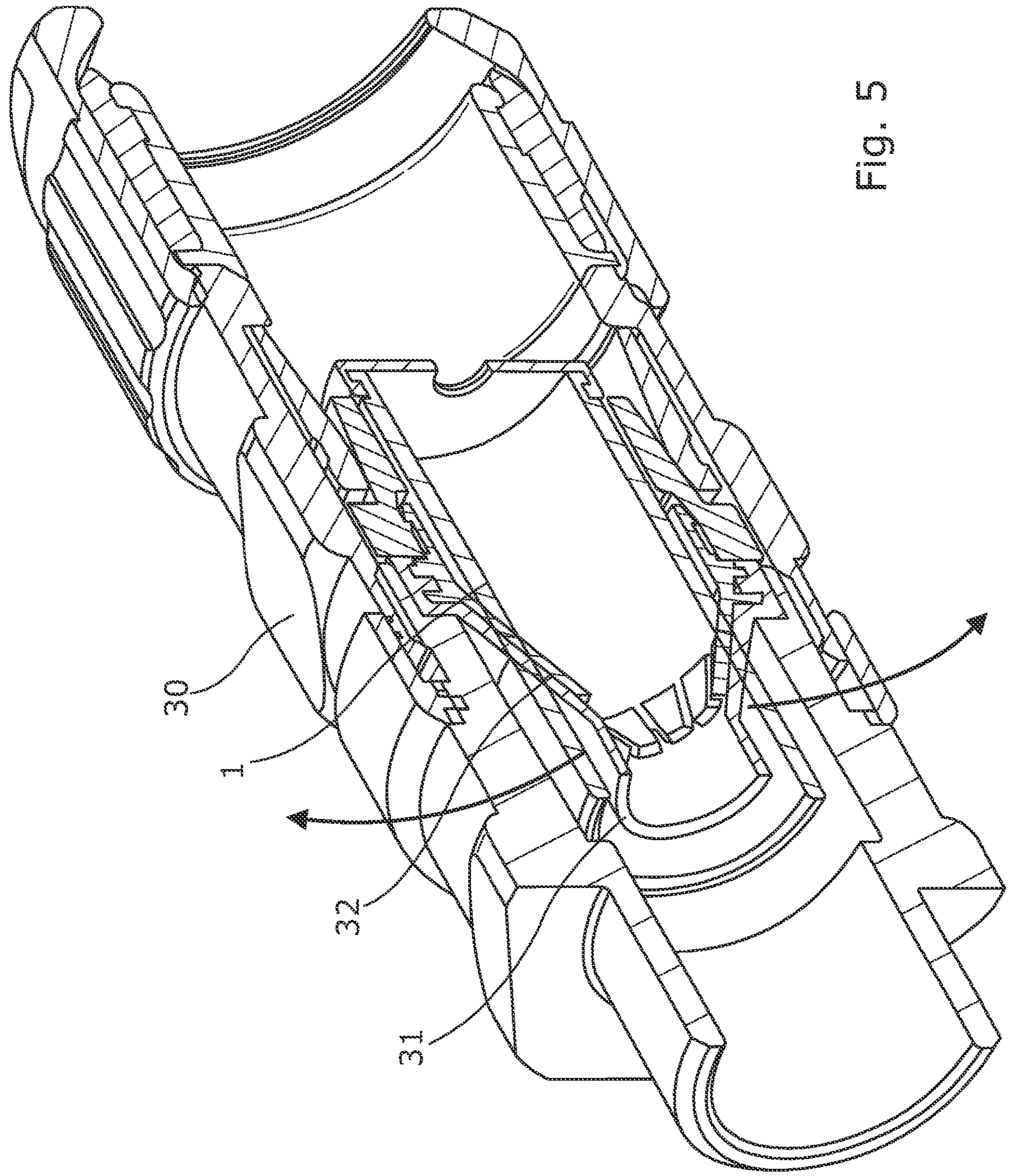

The tube 1 can be accommodated within the seal of any suitable cable gland. In FIG. 5 of the accompanying drawings, the cable gland 30 is a "Universal" cable gland, available from Hawke International (a division of Hubbell) of Ashton under Lyne, United Kingdom. In this case, the tube 1 acts to push the gland's internal seal 31 and seal support 32 radially outwards (as depicted by the bold arrows), which will seal against the outside of the tube 1.

Figure 6:
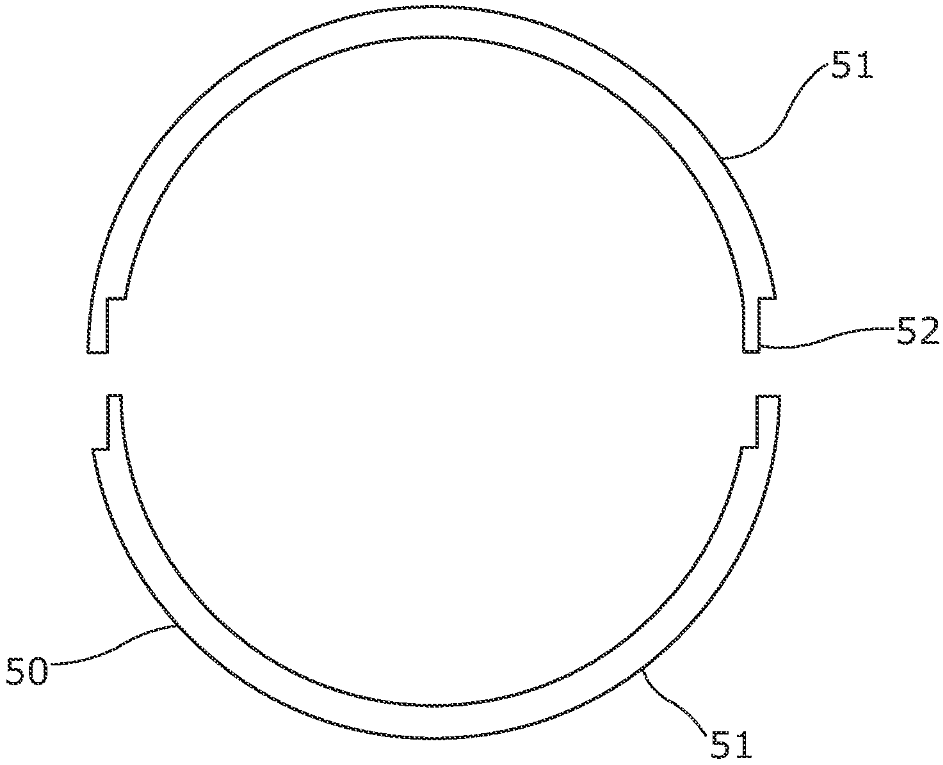
FIG. 6 shows a cross section through a tube for use in a seal in accordance with a second embodiment of the invention.

In a second embodiment of the invention shown in FIG. 6 of the accompanying drawings, the tube 50 is split along its length into two halves 51 which are semi-circular in cross section. These have cooperating tabs 52 which clip together. As such, an installer can take two halves 51 and clip them around an existing cable that is in need of, say, repair. The cable would need to have had at least the outer sheath(es) stripped back as before. The tube thus formed can be filled with sealable settable material as before, to prevent any transfer of gasses or other materials within the outer sheath (es). As such, this embodiment is particularly useful in "retrofit" situations where it is desired to fit the seal to a pre-existing (rather than newly installed) cable.

The invention claimed is:

1. A method of sealing a cable, the cable having at least one core and at least one sheath surrounding at least one core, the method acting to seal each core relative to each sheath, the method comprising;
 - exposing each core from each sheath to form an exposed part of each core, with an unexposed part of a core remaining with each sheath;
 - positioning the exposed part of each core and the unexposed part of each core within a tube;
 - filling the tube with a settable sealing material; and
 - sealing the tube in a cable gland after the sealing material has set,
 - wherein the tube includes a first end, a second end, and a seal positioned at the second end, the seal configured to stop the settable sealing material from escaping the second end during filling, the seal including an opening through which the cable extends.

2. The method of claim 1, wherein sealing the tube in a cable gland is done without using a barrier gland.

3. The method of claim 1, wherein the tube is rigid and/or transparent.

4. The method of claim 1, wherein the tube is formed of two parts that can be repeatedly separated and reconnected and typically split lengthways.

5. The method of claim 4, wherein the two parts are hinged together, typically via a living hinge molded into the material of the two parts.

6. The method of claim 4, wherein the step of positioning the parts within the tube comprises placing the two parts around the exposed and unexposed parts.

7. The method of claim 1, wherein the first end is open.

8. The method of claim 1, wherein there is at least one twisted pair of cores, each twisted pair of cores comprising two cores, twisted around each other, typically in a helix.

9. The method of claim 1, wherein the seal is connected adjacent the second end via an annular snap-fit connection.

10. A sealing member for a cable having at least one core and at least one sheath surrounding at least one core, the sealing member comprising:

a tube arranged to be placed over an exposed part of each core where the sheath has been removed from around the core and an unexposed part of each core where the sheath surrounds the core; and a settable sealing material arranged to fill the core, wherein the tube includes a first end, a second end, and a seal positioned at the second end, and wherein at least a portion of the tube is transparent, the seal configured to stop the settable sealing material from escaping the second end during filling, the seal including an opening through which the cable extends.

11. The sealing member of claim 10, wherein the tube is formed of two parts, split along a length of the tube, that can be repeatedly separated and reconnected.

12. The sealing member of claim 11, wherein the two parts are hinged together, typically via a living hinge molded into the material of the two parts.

13. The sealing member of claim 11, wherein the two parts are discrete components separable from one another.

14. The sealing member of claim 10, wherein the first end is open.

15. The sealing member of claim 10, wherein the tube includes a channel receiving a portion of the seal to connect the seal to the second end.

16. A sealed cable comprising:

at least one core;

at least one sheath surrounding at least one core;

a sealing member for sealing at least a portion of the sheath and the core, the sealing member including a tube surrounding an exposed part of each core where the sheath has been removed from around the core and an unexposed part of each core where the sheath surrounds the core; and a settable sealing material positioned in the tube to enclose the exposed core, wherein the tube includes a body and a seal, the body having a first end and a second end, and seal positioned at the second end and connected to the body via an annular snap-fit connection, the seal configured to stop the settable sealing material from escaping the second end during filling, the seal including an opening through which the cable extends.

17. The sealed cable of claim 16, wherein the at least one core includes at least one twisted pair of cores, each twisted pair of cores comprising two cores, twisted around each other, typically in a helix.

18. The sealed cable of claim 16, wherein the sealing member prevents the flow of gas or other material through the cable between each sheath and each core.

19. The sealed cable of claim 16, wherein a cable gland is sealed onto an outer surface of the tube.

20. The sealed cable of claim 19, wherein the cable glade does not include a barrier gland.

* * * * *